(12) United States Patent
Monco

(10) Patent No.: US 12,500,622 B2
(45) Date of Patent: Dec. 16, 2025

(54) MOBILE DEVICE ACCESSORY FOR PRIVACY PROTECTION

(71) Applicant: Nicholas Monco, Grand Rapids, MI (US)

(72) Inventor: Nicholas Monco, Grand Rapids, MI (US)

( * ) Notice: Subject to any disclaimer, the term of this patent is extended or adjusted under 35 U.S.C. 154(b) by 397 days.

(21) Appl. No.: 17/986,061

(22) Filed: Nov. 14, 2022

(65) Prior Publication Data

US 2024/0162930 A1 May 16, 2024

(51) Int. Cl.
*H04B 1/3888* (2015.01)
*H04M 1/04* (2006.01)

(52) U.S. Cl.
CPC ............ *H04B 1/3888* (2013.01); *H04M 1/04* (2013.01); *H04M 2201/08* (2013.01)

(58) Field of Classification Search
CPC .... H04B 1/3888; H04M 1/04; H04M 2201/08
USPC ...................................................... 455/575.8
See application file for complete search history.

(56) References Cited

U.S. PATENT DOCUMENTS

| | | | | |
|---|---|---|---|---|
| 6,674,996 B1* | 1/2004 | Weckstrom | .............. | H04R 1/38 381/357 |
| 7,133,707 B1* | 11/2006 | Rak | ......................... | H04M 1/23 455/566 |
| 12,244,929 B1* | 3/2025 | Risley | .................. | H04N 23/695 |
| 2009/0196429 A1* | 8/2009 | Ramakrishnan | ..... | H04R 29/004 381/26 |
| 2013/0329931 A1* | 12/2013 | Tan | ........................ | H04R 1/086 381/355 |
| 2021/0072803 A1* | 3/2021 | Lai | ......................... | G06F 1/1656 |
| 2022/0114287 A1* | 4/2022 | DiSalvo | ................ | G06F 1/1679 |

* cited by examiner

*Primary Examiner* — April G Gonzales
(74) *Attorney, Agent, or Firm* — Vitale, Vickrey, Niro, Solon & Gasey LLP

(57) ABSTRACT

The present disclosure relates to mobile device cases having enhanced privacy protection features. In particular, presently disclosed mobile device cases include devices for physically blocking a mobile device's microphone and/or camera by forming a seal around them, thereby having the benefit of preventing a mobile device from unknowingly recording a user's voice or video when a blocking element is in a closed position.

16 Claims, 7 Drawing Sheets

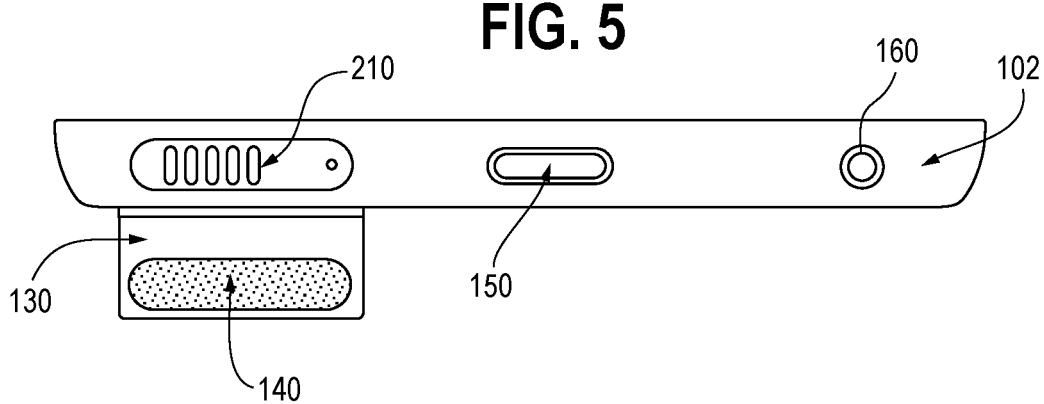
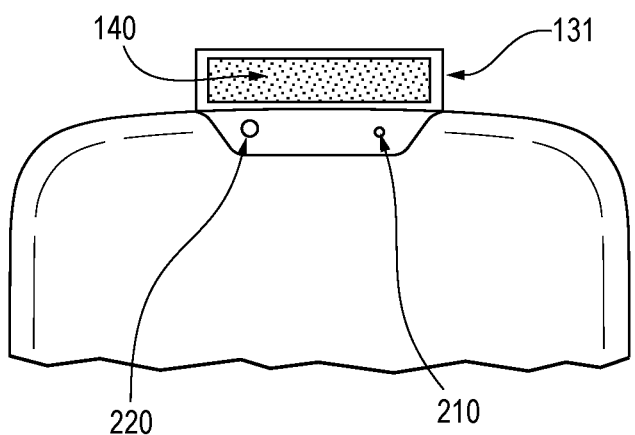
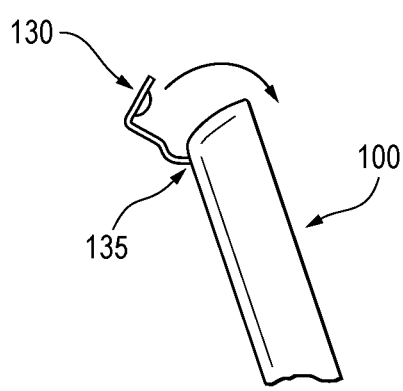
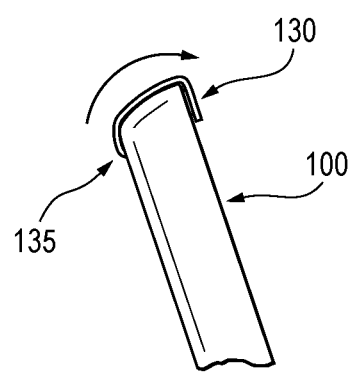

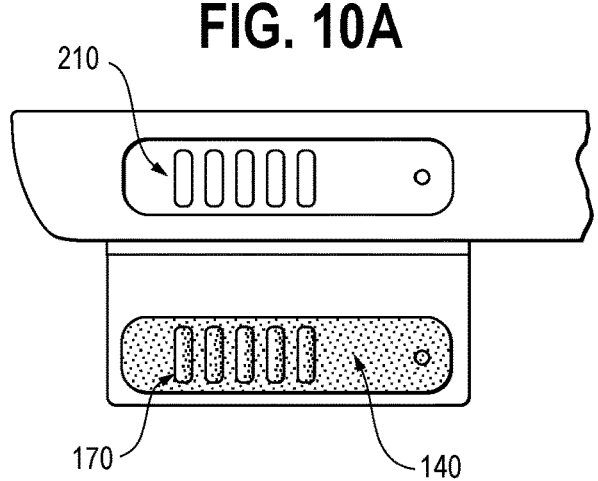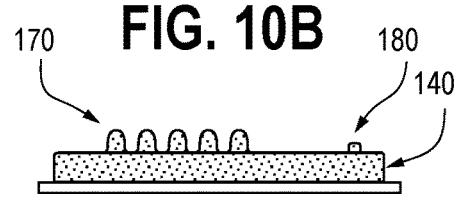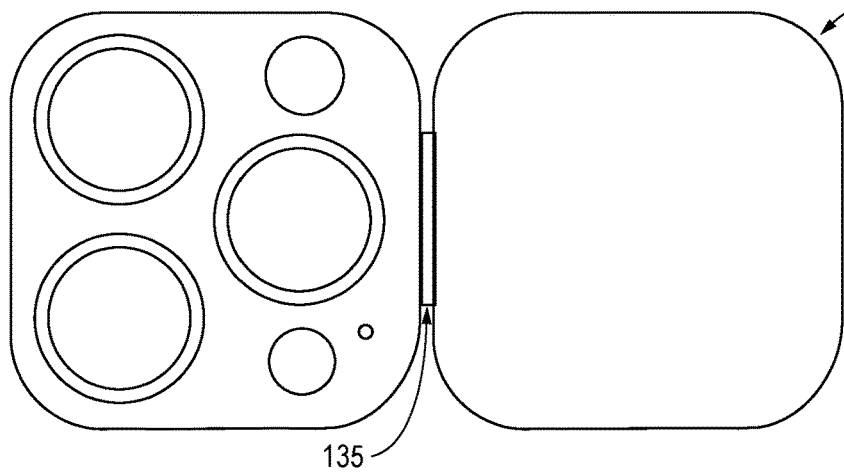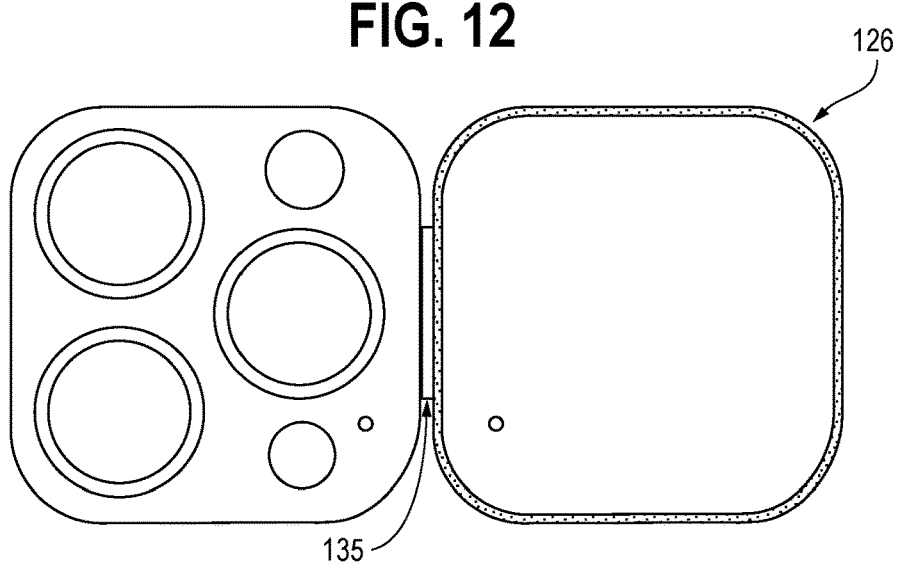

MOBILE DEVICE ACCESSORY FOR PRIVACY PROTECTION

CROSS-REFERENCE TO RELATED APPLICATIONS

None

BACKGROUND OF THE INVENTION

A. Field of the Invention

The present inventions relate to the technical field of mobile device accessories, and in particular, mobile device accessories having physical blockers for blocking a mobile device's microphone and/or camera to improve a user's privacy protection.

B. Description of the Related Art

Microphones and cameras have become ubiquitous in mobile devices today. The increase in microphones and cameras is accompanied by an increased risk of spying on users. For example, internet media companies like Facebook, Google, and so forth, are known to collect as much information about their users as possible. Aside from internet media companies, there is also the risk of a user unsuspectingly activating a microphone or camera, thereby allowing third parties to see or hear the unsuspecting user's private conversations.

Prior art references disclose various attempts at protecting a user's privacy, but have significant shortcomings. For example, some prior art devices purport to enable users to encrypt their text messages and photos, and to make private VoIP calls using a built-in microphone and proprietary encryption processor. This prior art design may also include a lockdown mode, in which the cell phone case jams the microphone so that conversations cannot be overheard or recorded. A significant shortcoming of this reference is its costs, power requirement, and significant bulk added to the device. In another example, prior art devices may include a sliding mechanism that can be mechanically pulled apart at the ends, thus exposing a microphone and camera. Disadvantageously, the sliding mechanism adds complexity to the case, is not easy to slide apart, and introduces a point of failure, which is to say, the sliding mechanism may break, making the device useless.

Accordingly, there is a need for a device that is effective at blocking cameras and microphones, which can be made and sold at a low cost, which does not require a power source, and which does not add any weight or bulk to a mobile device.

BRIEF SUMMARY OF THE INVENTION

The present inventions solve the problem of improving a mobile device user's privacy by forming a seal that blocks a mobile device's microphone and/or camera. The present inventions provide a mobile device case that comprises a front surface, a back surface, a top surface, a bottom surface, and two side surfaces. The mobile device case may further comprise a microphone cut-out and a microphone blocker. The microphone blocker may be attached to the mobile device via a hinge, such as a living hinge, and configured to toggle between an open position and a closed position. The microphone blocker may include a sound blocking portion that is configured to mate with the microphone cut-out when the microphone blocker is in the closed position, to form a seal about the microphone, thereby increasing the user's privacy. In alternative embodiments, a privacy blocker is provided which may block both the microphone and the camera of a mobile device.

BRIEF DESCRIPTION OF THE DRAWINGS

FIG. 5 shows a bottom view of a mobile device case having a microphone blocker in an open position.

FIG. 6 shows a front view of a mobile device case having a privacy blocker in an open position.

FIG. 7 shows a side view of a mobile device case having a privacy blocker in an open position.

FIG. 8 shows a side view of a mobile device case having a privacy blocker in an open position.

FIG. 10A shows a bottom view of a mobile device case having a sound blocking portion with ridges.

FIG. 10B shows a side view of a sound blocking portion with ridges.

FIG. 11 shows a front view of a privacy blocker attached to a frame.

FIG. 12 shows a back view of a privacy blocker attached to a frame.

DETAILED DESCRIPTION OF THE INVENTION

Figure 1:
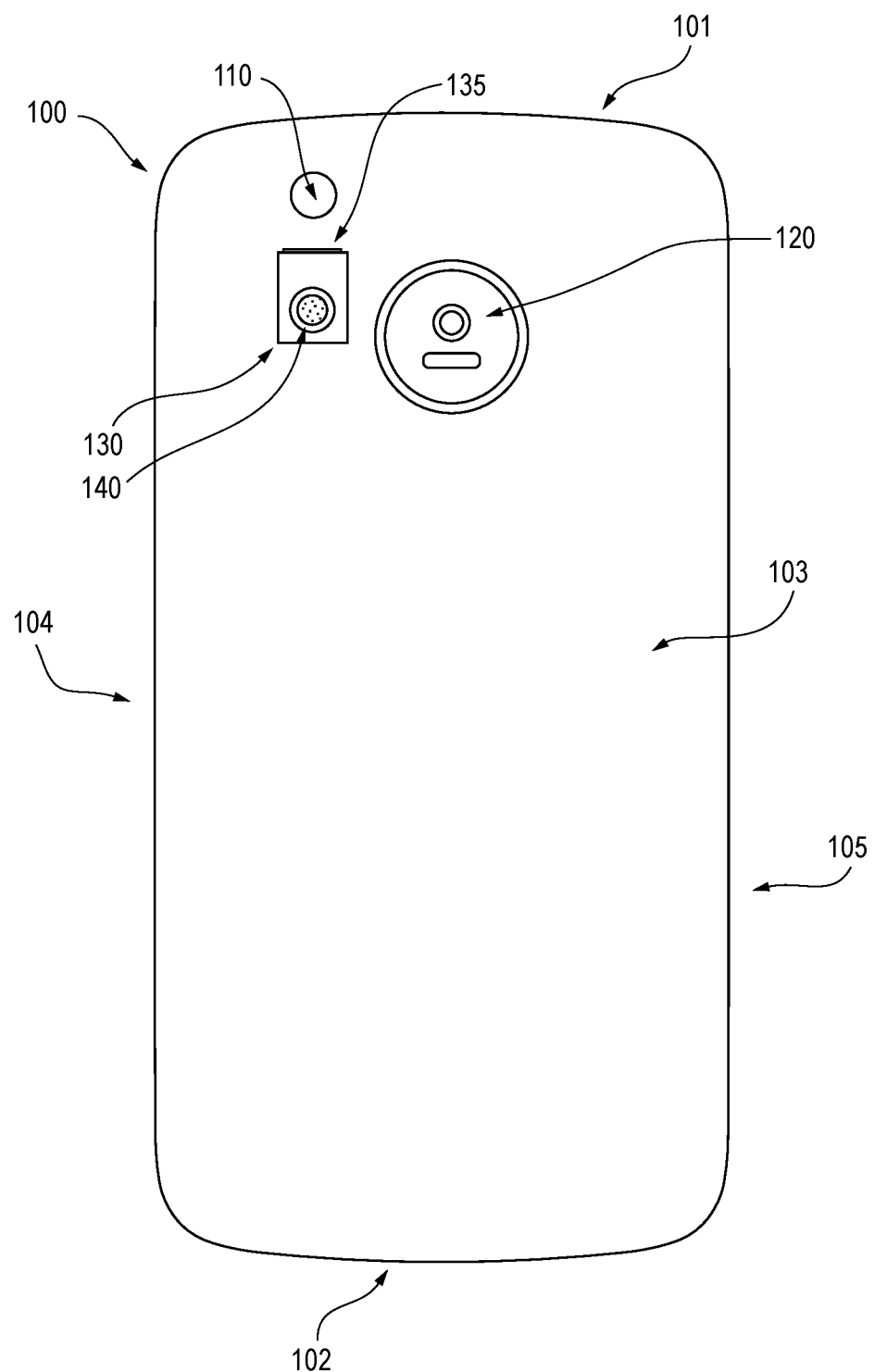
FIG. 1 shows the back side of a mobile device case having a microphone blocker in an open position.

As will become apparent from the following description, the presently disclosed inventions provide numerous advantageous over the prior art. Before any embodiments of the inventions are explained in detail, it is to be understood that the inventions are not limited in their application to the details of construction and/or arrangement of components set forth herein. The inventions are capable of other embodiments, and can be practices or carried out in various ways. Moreover, it should also be understood that the phraseology and terminology used herein for the purpose of this description should not be regarded as limiting.

The following discussion is presented to enable a person skilled in the art to make and use embodiments of the invention. Various modifications to the illustrated embodiments will be readily apparent to those skilled in the art, and the principles disclosed herein can be applied to other embodiments and applications without departing from the spirit of the invention. Thus, the scope of the inventions are not intended to be limited to the embodiments expressly described, but are to be accorded the widest scope consistent with the principles and features disclosed herein. The following detailed description is to be read with reference to the figures, in which the elements in different figures have like reference numerals. The figures, which are not necessarily to scale, depict selected embodiments and are not intended to limit the scope of embodiments of the invention. A person having ordinary skill in the art will recognize the examples provided herein have many useful alternatives and fall within the scope of embodiments of the invention.

The present disclosure is generally directed to accessories for blocking the camera and/or microphone of a mobile device. Turning first to FIG. 1, certain embodiments of the inventions include a mobile device case (100) which may hold a mobile device such as a cell phone. As used herein, it should be understood that the term mobile device includes cell phones, but also includes other mobile electronic devices such as tablet computers and laptop computers. The mobile device case (100) may have a top surface (101), a bottom surface (102), a front surface (not shown), a back surface (103), and two side surfaces (104), (105).

The mobile device case (100) may include cut-out openings to permit microphone and camera access. In the example of FIG. 1, a microphone cut-out (110) and a camera cut-out (120) are shown to be cut out of the back surface (###). It should be understood that microphone cut-out (110) and/or camera cut-out (120) may be positioned on any surface of the mobile device case (100). A person of ordinary skill in the art, having the benefit of the present disclosure, would understand that the positioning of the microphone cut-out (110) and/or camera cut-out (120) can be selected to correspond to the configuration of a mobile device that will be inserted into mobile device case (100). FIG. 1 further shows a flexible microphone blocker (130) which a user can toggle between an open and a closed position. The microphone blocker (130) is secured to the mobile device case (100) by way of a flexible hinge portion (135), which permits the microphone blocker (130) to toggle between its open and closed positions.

It should be understood that the flexible hinge portion (135) can take the form and material of any hinge known in the art. Commonly, mobile device cases are comprises of polycarbonate, thermoplastic polyurethane (TPU), or a combination of the two. Therefore, in some embodiments of the invention, the mobile device case (100), including the flexible hinge portion (135) and the microphone blocker (130) may all be formed of the same materials. The hinge portion (135) may be formed using techniques referred to as a living hinge, or an integral hinge, which means that the hinge portion (135) is formed of the same material as the two portions it connects. Such a design is advantageous in the present embodiments because of its low cost and ease of manufacturing.

Referring still to FIG. 1, the microphone blocker (130) is shown to be in the open position, meaning that the microphone cut-out (110) is unblocked. The microphone blocker (130) may comprise a sound blocking portion (140). The sound blocking portion (140) may take a shape that corresponds to the shape of the microphone cut-out (110), thereby permitting the sound blocking portion (140) to mate (for example, by press-fit) with the microphone cut-out (110) when the microphone blocker (130) is in its closed position. In FIG. 1, the microphone blocker (130) is shown to be open, revealing its interior surface, to which the sound blocking portion (140) is affixed. In the embodiment of FIG. 1, microphone blocker (130) is shown to take a square shape, and sound blocking portion (140) is round so as to make with the round microphone cut-out (110).

Figure 2:
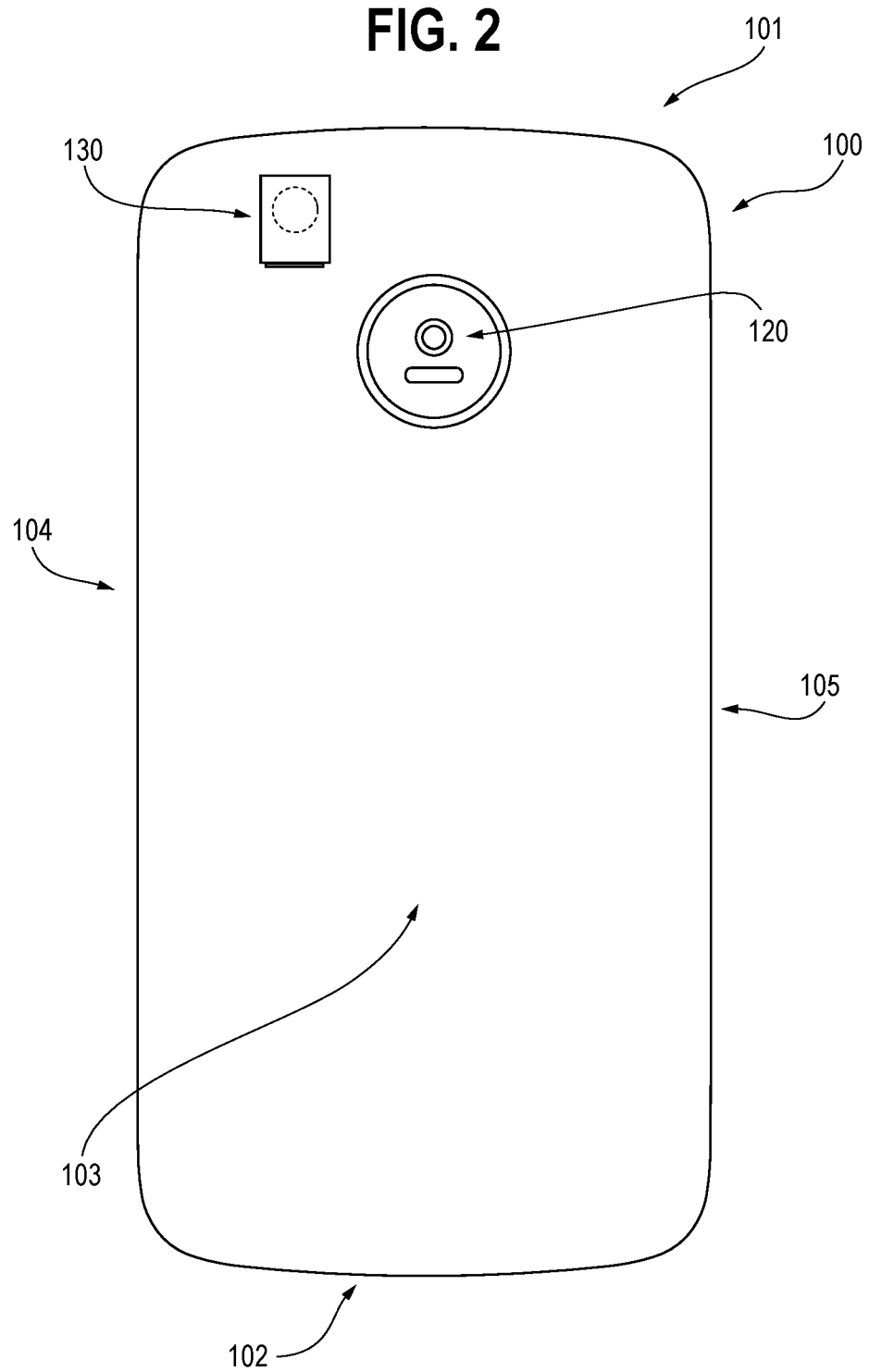
FIG. 2 shows the back side of a mobile device case having a microphone blocker in a closed position.

For example, in FIG. 2, the microphone blocker (130) is shown to be in the closed position. It should be understood that the sound blocking portion (140) may be press-fit into the microphone cut-out (110), thereby forming a tight seal that blocks sound from reaching the microphone. The tighter the seal between the sound blocking portion (140) and the microphone cut-out (110), the less sound can be picked up by the microphone. The present inventions are not limited to embodiments using press-fit between the sound blocking portion (140) and the microphone cut-out (110). For example, a person of ordinary skill in the art, having the benefit of the present disclosure, would recognize that a magnetic connection may instead be used to secure the two components, instead of, or in addition to, press-fit. In some embodiments of the invention, the sound blocking portion (140) may be comprised of a mass-loaded vinyl, acoustic mineral wool, dense rubber, or any other material known to block or reduce sound transmission.

In FIGS. 1 and 2, the flexible microphone blocker (130) is shown to be positioned on the backside of a cell phone. However, it should be understood that the present invention extends equally to embodiments in which a mobile device's microphone is positioned on a different surface, or to embodiments in which a mobile device has multiple microphones in multiple positions.

Figure 3:
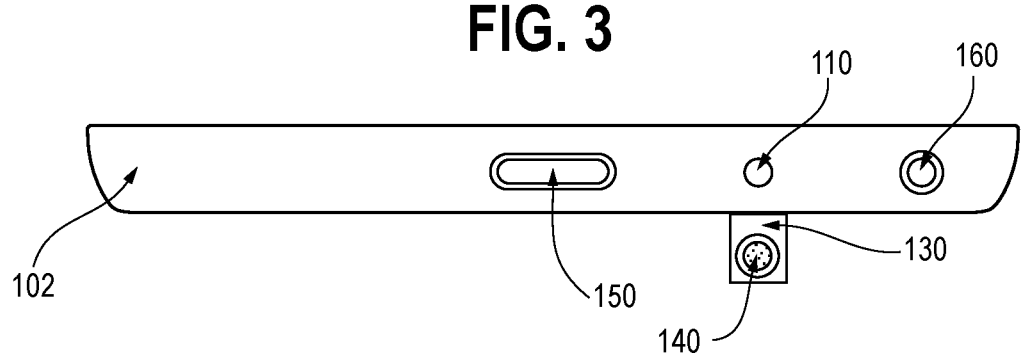
FIG. 3 shows a bottom view of a mobile device case having a microphone blocker in an open position.
Figure 4:
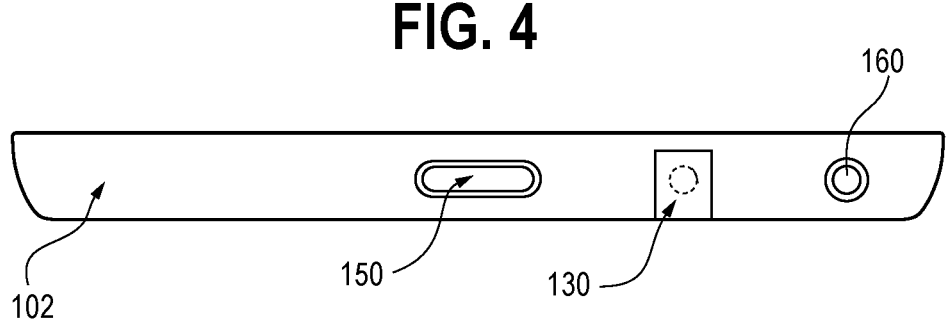
FIG. 4 shows a bottom view of a mobile device case having a microphone blocker in a closed position.

FIGS. 3 and 4 show the underside of a mobile device case with a mobile device mounted therein. Specifically, FIGS. 3 and 4 show a power cord cut-out (150), for example for receiving a USB-C charging cable. Also shown are a microphone cut-out (110) and a headphone jack cut-out (160). In FIG. 3, the flexible microphone blocker (130) is shown to be in the open position, whereas FIG. 4 shows the microphone blocker (130) to be in its closed position. As mentioned above, the sound blocking portion (140) may be press-fit into the microphone cut-out (110), which in turn secures the microphone blocker (130) into its closed position, where it remains until a user dis-engaged the press-fit to re-open the microphone.

An alternative view of microphone blocker (130) in an open position is shown in FIG. 5. In this embodiment, microphone blocker (130) take the shape of an elongated rectangle, but it should be understood that the inventions are not limited to any particular shape. Microphone blocker (130) may be attached to the case (100) via living hinge (135) that is formed out of the same material as the case (100) is. On the interior surface of the microphone blocker (130) is a sound blocking portion (140), which is seen to align with the microphone cut-out (110). When the microphone blocker (130) is moved to its closed position, the sound blocking portion (140) mates with the edges of the microphone cut-out (110) so as to form a sound proof, or sound reducing, seal around a mobile device's microphone. In this way, closing the microphone blocker (130) seals the microphone and protects a user's surrounding conversations from being unknowingly recorded by the mobile device.

FIG. 6 discloses an embodiment in which a privacy blocker (131) covers both a microphone (210) and a camera (220). The privacy blocker (131) may take on many of the same attributes as microphone blocker (130), except it is understood that privacy blocker (131) may be relatively larger in size so as to block both a microphone (210) and camera (220). Like microphone blocker (130), privacy blocker (131) is secured to the mobile device case (100) by a hinge portion, which, in some embodiments, can be a living hinge or integrated hinge. Again, a sound blocking portion (140) is provided. In this embodiment, it may be preferable to use a magnetic connection to secure the privacy blocker (131) to the mobile device case (100), or directly to the mobile device. For example, the privacy blocker (131) may be magnetically charged, or it may include a magnet affixed to it (not shown). A corresponding magnetic portion may be provided on the mobile device case (100), or the magnetic connection may be made directly to the mobile device. However, press-fit may also be used.

FIGS. 7 and 8 show a side view of the embodiment described in FIG. 6. In FIG. 7, the privacy blocker (131) is shown in the open position, secured to the mobile device case (100) by way of hinge portion (135). A user may wish to keep the privacy blocker (131) in the open position, for example, while using the mobile device to participate in personal or business-related phone calls or video conferences. But once the user finishes their personal or business-related phone calls or video conferences, the user may become concerned that various applications on the mobile device will continue to listen to the user. For example, applications on the mobile device may continue to monitor the user to collect information about the user, such as by listening to the unsuspecting user's conversations with third parties. For that reason, the user may elect to engage the privacy blocker (131) by moving it from the open position (See FIG. 7) to the closed position (See FIG. 8). In the closed position, the camera is covered and the microphone is blocked from picking up any conversation. The optional sound blocking portion (140) adds a further barrier that protects against the microphone picking up any conversations surrounding the mobile device.

Figure 9A:
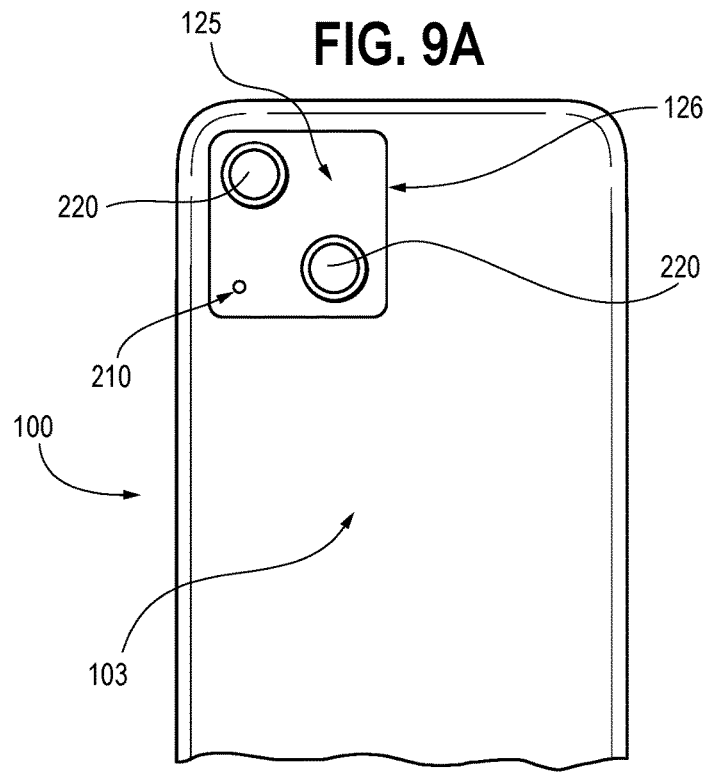
FIG. 9A shows a back view of an embodiment of the inventions.
Figure 9B:
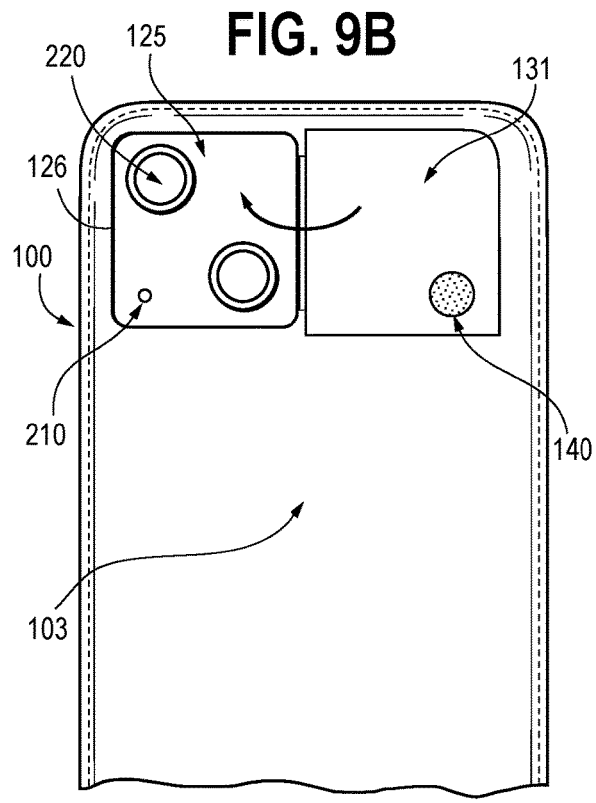
FIG. 9B shows a back view of an embodiment of the inventions having a privacy blocker in an open position.
Figure 9C:
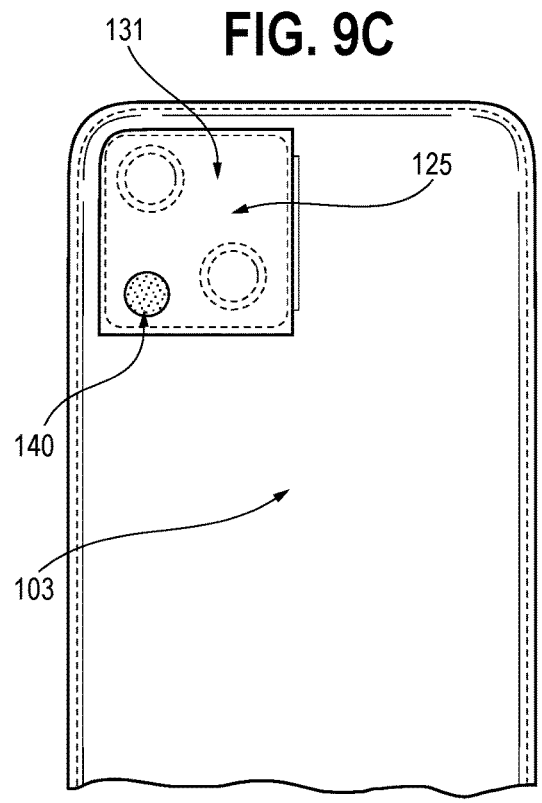
FIG. 9C shows a back view of an embodiment of the inventions having a privacy blocker in a closed position.

Turning next to FIGS. 9A, 9B, and 9C, the present inventions also include a privacy blocker (131) which may be configured to block the camera and microphone configuration of a mobile device such as the iPhone 12, and newer models. In such embodiments, the mobile device case (100) may include an enlarged combination cut-out (125) for access to both the microphone and the camera. The cut-out (125) may be defined by a frame (126) which lines the cut-out, for example, by press-fit. That is to say the frame (126) extends all along the inner edge of the cut-out (125). In the example shown in FIG. 9, the cut-out (125) is rectangular, and the frame (126) is a concentric rectangle extending along the interior edge of the cut-out (125). The frame (126) may be formed of plastic, thin metal wire, or any other suitable material. Further, the frame (126) may be coupled, by way of a hinge (135) to the privacy blocker (131). Consistent with the description provided throughout this specification, the privacy blocker (131) may be formed of any suitable material, and may include a particular sound blocking portion (140) which is position on the privacy blocker (131) so as to engage the microphone when in the closed position. Optionally, the interior surface of the privacy blocker (131) may be lined with a material for protecting the camera lens, such as a sound proof foam which has the dual advantage of creating a sound proof or sound reducing seal while simultaneously protecting the camera from scratches. FIGS. 11 and 12 show a top and bottom view of the frame (126), hinge (135) and privacy blocker (131) of FIGS. 9A, 9B, and 9C.

Optionally, embodiments of the invention may be directed to the frame (126), hinge (135) and privacy blocker (131) as a stand-alone apparatus. That is to say, it is not necessary for the inventions to integrated with a mobile device case (100). Rather, some embodiments of the invention provide frame (126), hinge (135) and privacy blocker (131) alone, having the benefit of permitting users to install the frame (126) on an already-existing mobile device case. In such an embodiment, a user may already have a protective case for their mobile device, such as the iPhone 12. The user's case may include the combination cut-out (125) for allowing access to the camera and microphone but lack the privacy blocker (131). Rather than replacing their existing mobile device case, the user may purchase embodiments of this invention to retro-fit the existing mobile device case with a privacy blocker. To accomplish this, the user would press-fit the frame (126) into the existing combination cut-out (125), which will cause the privacy blocker (131) to become aligned with the camera and microphone. As an alternative to press-fitting the frame (126) into the existing case, other embodiments may use an adhesive or glue to affix the frame (126) to a mobile device case. Once installed, the user can toggle the privacy blocker (131) between its open and closed positions as desired. It should be understood that while the iPhone 12 is specifically identified as a popular example, the scope of the invention is in no way limited to any particular model or mobile device.

FIGS. 10A and 10B illustrate specific details which may be used in embodiments of the inventions. In particular, FIGS. 10A and 10B illustrate a microphone blocker (130) or privacy blocker (131), which has a sound blocking portion (140) that is configured to correspond to the shape of a mobile device's microphone. For example, FIG. 10A shows a microphone having sound blocking ridges (###) that may correspond to larger microphone openings, and a nipple (###) which may correspond to a pin hole microphone opening. In operation, it is intended that the ridges (###) and/or nipple (###) align and correspond to the microphone openings of a given model of mobile device. Because they are aligned with such microphone openings, they can be press-fit into such openings to form a tight seal, thus blocking sound from reaching the microphone. In some embodiments, ridges (###) and nipple (###) may be formed of a semi-flexible materials, such as hard rubber, to provide for improved press-fit and a tighter sound blocking seal. FIG. 10B shows the optional ridges (###) and nipple (###) protruding from the sound blocking portion (140).

Figure 13:
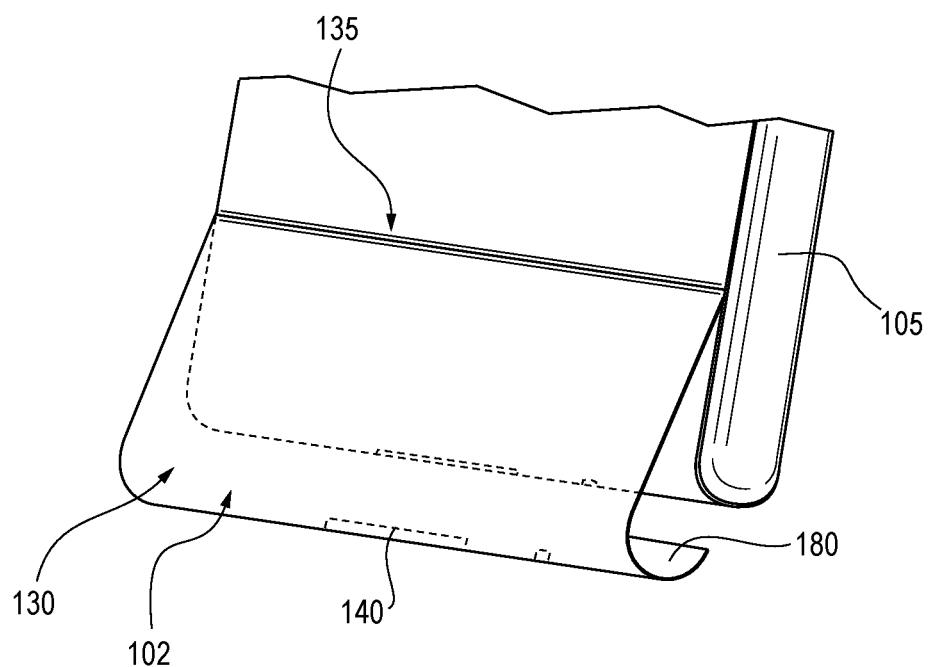
FIG. 13 shows a back view of an alternative embodiment of the inventions.

FIG. 13 shows an alternative embodiment of the inventions. In particular, FIG. 13 shows the back and bottom portion of a mobile device case (100). In this embodiment, microphone blocker (130) is seen to be integrated with the mobile device case (100) and extends the entire width of the mobile device case (100). Microphone blocker (130) is seen to be connected to the mobile device case (100) via living hinge (135) on one end, and the other end has a rounded interior surface (###). Optionally, the rounded interior surface (###) may include a sound blocking portion (140), which is aligned and configured to mate with the microphone cut out (###) of the mobile device case (100). When in the closed position, the microphone blocker (130) is flush with the mobile device case (100). As described above with respect to other embodiments, a user may pivot the microphone blocker (130) about the hinge to its open position when using the mobile device's microphone, and close the microphone blocker (130) to create a seal about the microphone and in turn protect the user's privacy.

As those of ordinary skill in the art having the benefit of the present disclosure will recognize, numerous changes and modifications may be made to the above-describe and other embodiments of the present disclosure without departing from the spirit of the invention as described herein, and defined in the claims. Accordingly, this detailed description of embodiments is to be taken in an illustrative, not limiting, sense.

The invention claimed is:
1. A mobile device case, comprising:
  a housing portion of the mobile device case having a front surface, a back surface, a top surface, a bottom surface, and two side surfaces;

a microphone cut-out in the housing portion and a microphone blocker, the microphone blocker being attached to housing portion of the mobile device case via an integral flexible hinge affixed to the back surface of the housing portion, the microphone blocker further being configured to toggle between an open position and a closed position whereby the microphone blocker is configured to overlap either the top portion or the bottom portion of the housing portion in the closed position;

a sound blocking portion affixed to an interior surface of the microphone blocker;

wherein the sound blocking portion is aligned to mate with the microphone cut-out to form a seal when the microphone blocker is in the closed position; and a camera cut-out in the housing portion and a camera blocker, the camera blocker being attached to the mobile device case via an integral flexible hinge affixed to the back surface of the housing portion, the camera blocker further being configured to toggle between an open position and a closed position.

2. The mobile device case of claim 1, wherein the microphone cut-out and the microphone blocker are positioned on the back surface of the mobile device case.

3. The mobile device case of claim 1, wherein the microphone cut-out and the microphone blocker are positioned on the bottom surface of the mobile device case in the closed position.

4. The mobile device case of claim 1, wherein the sound blocking portion further comprises at least two sound blocking ridges.

5. The mobile device of claim 4, wherein the sound blocking portion further comprises at least one nipple configured to mate with the microphone.

6. The mobile device of claim 1, wherein the microphone cut-out is configured to receive the microphone blocker by press-fit to secure the microphone blocker in its closed position.

7. The mobile device of claim 1, wherein the microphone blocker is configured to be secured in its closed position via a magnet.

8. The mobile device case of claim 1, wherein the microphone blocker and camera blocker are separate structure.

9. The mobile device case of claim 1, wherein the microphone blocker and camera blocker are an integral structure.

10. A method for protecting privacy, comprising:

attaching mobile device case to a mobile device, the mobile device case having a front surface, a back surface, a top surface, a bottom surface, two side surfaces, a microphone cut-out and a microphone blocker, the microphone blocker being attached to the mobile device case an integral flexible hinge affixed to the back surface of the housing portion;

toggling the microphone blocker from an open position to a closed position to protect a user's privacy whereby the microphone blocker is configured to overlap either the top portion or the bottom portion of the housing portion in the closed position; and toggling the microphone blocker to an open position to permit the user to access the microphone while using the mobile device; and a camera cut-out and a camera blocker, the microphone blocker being attached to the mobile device case via an integral flexible hinge affixed to the back surface of the housing portion.

11. The method of claim 10, wherein the microphone cut-out and the microphone blocker are positioned on the back surface of the mobile device case.

12. The method of claim 10, wherein the microphone cut-out and the microphone blocker are positioned on the bottom surface of the mobile device case in the closed position.

13. The method of claim 10, wherein the sound blocking portion further comprises at least two sound blocking ridges.

14. The method of claim 13, wherein the sound blocking portion further comprises at least one nipple configured to mate with the microphone.

15. The method of claim 10, further comprising the step of press-fitting the microphone blocker in its closed position.

16. The method of claim 10, further comprising the step of magnetically attaching the microphone to its closed position via a magnet.

* * * * *